United States Patent [19]

Auger et al.

[11] 4,398,802
[45] Aug. 16, 1983

[54] SOLAR MIRROR HAVING CONTIGUOUS REFLECTING PANELS MOUNTED ON A MOVABLE FRAME

[75] Inventors: Henri Auger, Le Vesinet; Jean-Pierre Acloque, Meriel, both of France

[73] Assignee: Saint Gobain Vitrage, Neuilly-sur-Seine, France

[21] Appl. No.: 283,468

[22] Filed: Jul. 15, 1981

[30] Foreign Application Priority Data

Jul. 29, 1980 [FR] France ............................ 80 16682

[51] Int. Cl.³ .............................................. G02B 7/18
[52] U.S. Cl. .................................. 350/292; 126/438; 350/310
[58] Field of Search ............... 126/438, 439; 248/480, 248/485, 475 R; 350/292, 299, 288, 310, 295

[56] References Cited

U.S. PATENT DOCUMENTS

| | | | |
|---|---|---|---|
| 3,466,119 | 9/1969 | Francia | 126/438 X |
| 4,154,219 | 5/1979 | Gupta et al. | |
| 4,226,506 | 10/1980 | Auger | 350/310 X |
| 4,298,248 | 3/1981 | Lapp | 350/310 |

FOREIGN PATENT DOCUMENTS

| | | |
|---|---|---|
| 2738665 | 3/1979 | Fed. Rep. of Germany . |
| 2837098 | 2/1980 | Fed. Rep. of Germany . |
| 307699 | 10/1902 | France . |
| 2441188 | 6/1980 | France . |

*Primary Examiner*—Samuel Scott
*Assistant Examiner*—Randall L. Green
*Attorney, Agent, or Firm*—Pennie & Edmonds

[57] ABSTRACT

A solar mirror made up of a plurality of contiguous rectangular reflector panels. The panels are supported on their long sides by precambered sections. These sections are individually connected to spaced parallel extending members forming joists and comprise part of a rigid frame which includes a single bearing girder movably mounted with respect to a fixed base. Distance adjustment means are provided for moving the members perpendicular to the longitudinal axis of the girder and angular adjustment means are provided to rotate the members about the longitudinal axis.

7 Claims, 16 Drawing Figures

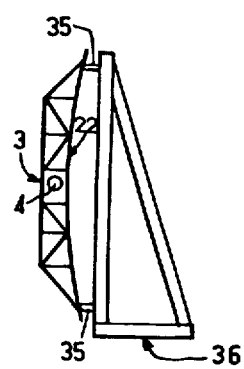
FIG.2
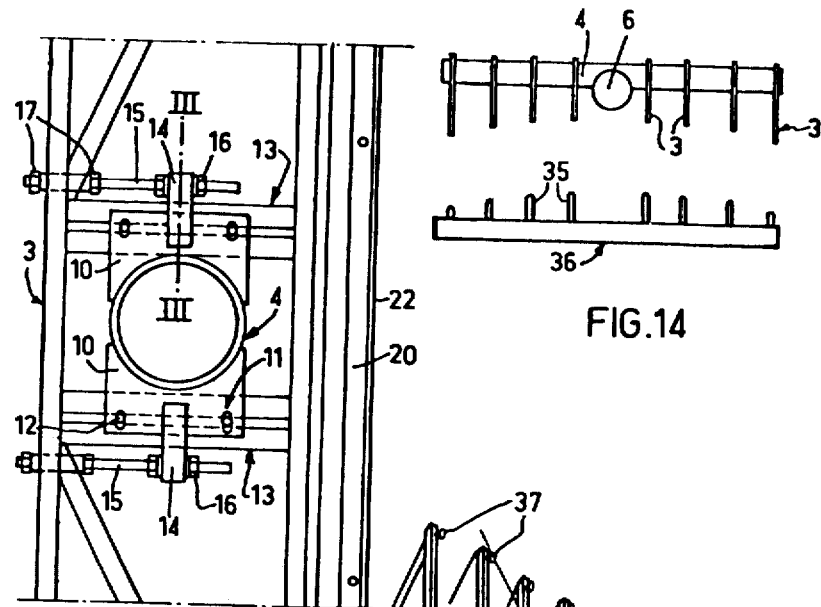
FIG.14
FIG.15
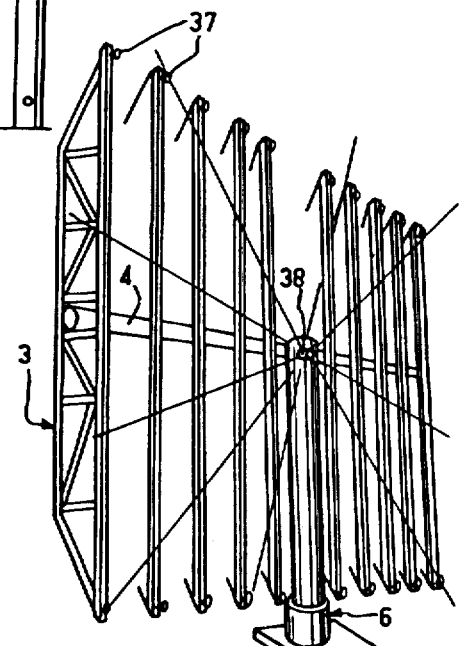
FIG.16

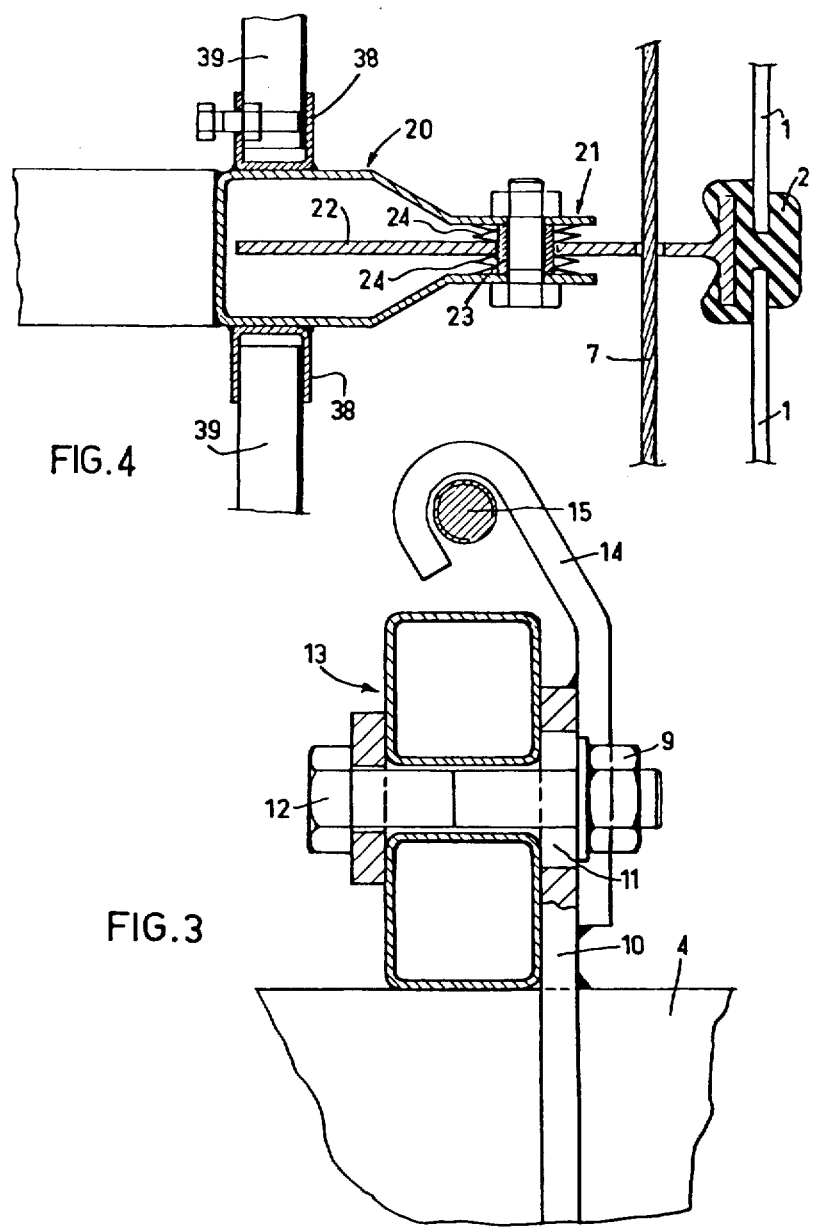

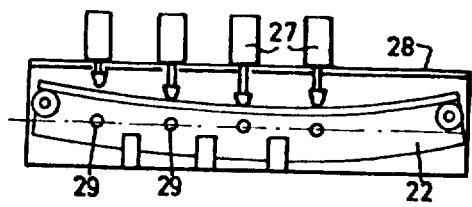
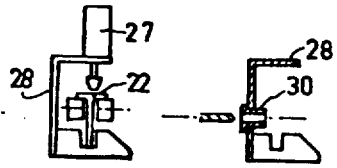
FIG.6　　　　FIG.7　　FIG.8
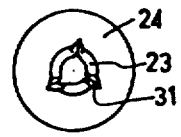
FIG.9　　　　FIG.10
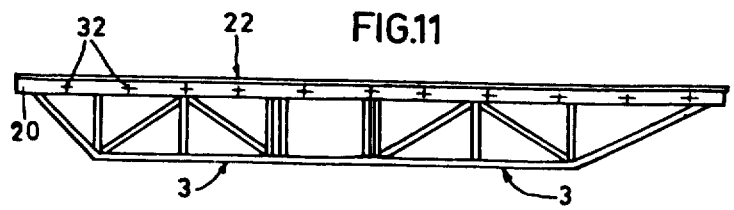
FIG.11
FIG.12　　　FIG.13
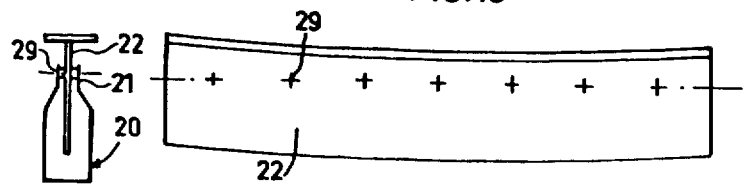

SOLAR MIRROR HAVING CONTIGUOUS REFLECTING PANELS MOUNTED ON A MOVABLE FRAME

TECHNICAL FIELD

This invention relates to a solar mirror having a concave surface formed of a plurality of contiguous reflector panels mounted on a rigid frame. More particularly this invention relates to a mirror where the panels are mounted on their long sides to cambered sections to give the panels a precise cylindrical curvature while the short sides of the panels remain free.

BACKGROUND ART

Solar mirrors are intended for equipping solar power plants, which, in a known manner, usually comprise a large number of reflectors, arrayed along the arcs of concentric circles, in order to reflect solar radiation to a boiler positioned at the top of a tower and located in the center of the array of reflectors. The boiler feeds steam to a turbine located at the base of the tower which in turn drives an electrical generator. Naturally it is necessary periodically to change the orientation of each of the reflectors in order for the reflected solar light to continue to be projected onto the boiler and, with a view to achieving this, the reflectors are mounted on adjustable bases, the position of which is automatically adjusted at regular intervals.

In order to prevent the luminous spot formed by each reflector on the receiver of the boiler from spreading beyond the limits of the receiver, the reflectors must be close in shape to a large radius spherical mirror.

Such mirrors must fulfill a certain number of requisites, among which are the following:

(a) they must be relatively inexpensive, in order for the solar power station to be competitive with traditional electrical generating plants;
(b) they must be reliable, so as to curtail replacement, maintenance and adjustment costs;
(c) they must keep a shape close to that of the ideal convergent mirror, in spite of deformation due to wind, heat and their own weight; and
(d) they must be relatively lightweight, in order to simplify the design of the swivel base.

With a view to meeting these conditions, it has already been proposed by the Saint-Gobain Techniques Nouvelles corporation, in French patent application Ser. Nos. FR 76 07756 and published under No. FR 2 344 852 to build convergent mirrors comprising a frame which supports a plurality of reflecting elements or panels, at least one of which is appreciably cylindrical and results from the deformation of a rectangular flat strip. Each of the panels are carried on the frame by means of elastomer edge strips which engage the long sides of the panels and also engage flanges formed integrally with the frame.

In constructing these mirrors, the rectangular reflecting strips are deformed at the work site by means of bending stresses applied along the entire length of the long sides of the strips when they are put into place on the supporting frame, while the short sides are left free during the bending of the long sides. More specifically, elastic deformation is imparted at the work site to a sectional member by the use of a template where the sectional member is destined to support the edge strip of a reflector panel and the sectional member thus deformed is fastened to the mirror frame.

In ordinary practice, mirrors of this type made in this manner comprise part of a rigid structure which can be directed in different directions with respect to a base anchored to the ground and where the rigid structure has a flat framework which supports T irons, arranged for example in vertical or horizontal lines, forming cambered sections which are brought onto the reference sphere by shaping. A shaping machine rolling on curved rails and equipped with a template arranged in a vertical plane makes it possible to place and fix each section on a beam in the desired position, after it has been cambered to the desired curvature.

This method makes it possible to rapidly assemble each mirror, but it requires a heavy, costly forming structure. This method also has the drawback that it can be utilized only at the site where the mirror is to be installed.

To remedy this drawback, solar mirrors have been proposed in which the reflector panels are supported by prefabricated cambered sections where the sections are assembled at the mirror assembly site prior to the reflector panels being positioned in place. Necessary adjustments to the sections are made without the necessity of using any heavy machines for shaping the sections at the site. Thus, in U.S. Pat. No. 4,226,506, there is disclosed a solar mirror comprising a rigid frame which can be moved with respect to a stationary base. The frame comprises joists formed by spaced parallel members provided with precambered sections which are curved to the curvature of the mirror and on which the long sides of rectangular reflector panels are connected by means of flexible fasteners while the short side of the panels remain free. In this mirror construction, the precambered sections are fastened by auxiliary T sections the flanges of which rest on the parallel members and the web of each of which has a longitudinal slot in which a web of the precambered sections is engaged and fastened.

By this construction it is possible to mount the auxiliary sections on the parallel members at the factory with the slot in a web being made straight by a suitable adjustment means. The precambered sections which are also T shaped are assembled in the slots while at the factory and shaped using a template. The resulting joist assemblies, including the parallel members and precambered sections are thus assembled along with the other structure making up the solar mirror at the mirror installation site.

The joists are assembled on girders of the frame by pins which are provided with adjustment means making it possible to adjust the distance between a girder and a member mounting a precambered section so that a radial adjustment is provided to assure that a panel surface is properly positioned with the mirror surface. More particularly, the members comprising the joists are mounted on the girders by assembly pins or gudgeons which extend perpendicular to the lengthwise direction of the girders and members. Each assembly pin is fixed with respect to a member and extends through a housing contained in a girder where the housing rests on a portion of the girder to support the weight of the reflector panels and frame. The pins engage a fastening element provided with articulated adjustment means by which the pins may be adjusted in an axial direction and which may accommodate pivoting of the member with respect to the girder.

It is an object of the present invention to provide a solar mirror of the general type as disclosed in U.S. Pat. No. 4,226,506 but which is less costly to manufacture and assemble and wherein the adjustment of the joists or parallel members with respect to a girder is simplified.

BRIEF SUMMARY OF THE INVENTION

A purpose of the present invention is to reduce the rigid frame of a solar mirror to one having a single horizontal girder and to have joists in the form of spaced parallel extending members that are individually adjustable in a plane perpendicular to the longitudinal axis of the girder.

More particularly, the invention comprises a solar mirror having a plurality of contiguous reflector panels mounted on a rigid frame which is movable with respect to a fixed base. The frame includes a plurality of joists comprising parallel spaced members each mounting a precambered section curved or arched to the curvature of the mirror and where each section engages and supports the long side of a rectangular reflector panel. The mirror is characterized in that it has a single girder extending perpendicular to and supporting the parallel members and in having adjustment means for moving each member in a plane perpendicular to the longitudinal axis of the girder and a pivot means for pivoting the member in the plane with respect to the girder.

Preferably the adjustment means and pivot means comprise on each parallel member two slides and two flanges fixed to the girder. Two tie bolts are connected to a parallel member and nuts engage the tie bolts to adjust the position of the slides with the flanges and thus the member with respect to the girder.

Each of the flanges preferably has two bolts going through an associated slide. In a first adjustment the distance from a parallel member to the girder or more precisely from the pivot axis of the mirror is made by simultaneously screwing or unscrewing the two tie bolts in relation to the flanges of the girder. Then, angular or pivotal adjustment is accomplished by screwing one of the tie bolts, and if necessary, unscrewing the other. When the member is in the desired position, the slides are secured with respect to the flanges by locking the bolts extending through the slides.

Angular adjustment of a parallel member in relation to the girder using rigid elements such as tie bolts is possible because the angular movement of a member is very slight involving only a few degrees of play and can result from a slight deformation of the rigid elements. Preferably, in order to facilitate angular adjustment of the member, the axis of one of the tie bolts is positioned near the pivotal axis of the mirror.

The girder does not enter into the angular adjustment of the members and it may be of any cross-sectional shape including a circular, square or other cross-section. The joists comprising the spaced prallel members are mounted on the girder without any means to obtain precise adjustment of height with respect to the girder as this is not necessary.

The joists or parallel members in the mirror of the present invention are movable only in a plane extending perpendicular to the plane of the mirror whereas in the mirror of U.S. Pat. No. 4,226,506, the joists are in addition to being movable in a plane perpendicular to the mirrors are also able to be directed. To provide an additional degree of freedom in the mirror construction according to the invention, the precambered sections which support the long sides of the reflector panels are carried by flexible articulated pins which mount the sections onto auxiliary slotted parts of the parallel members where the slotted parts form cradles. The pin engages a hole in a web of the precambered section with elastic washers being placed on the pin between the arms of the cradle and the web of the precambered section.

The precambered sections, as in the sections disclosed in the aforementioned United States patent, preferably have a T shaped cross-section the flanges of which support the reflector panels through flexible edge strips. The web of the T shaped cross-section engages in the slot of the auxiliary portion of the parallel members. The precambered sections are cambered at the factory, and after cambering, holes are drilled in the web at the points through which the articulated pins are to extend.

When the precambered sections are inserted into the cradles of the parallel members, they are only partially fastened by the pins to restore their initial cambering and the parallel member with attached sections are shipped to the mirror assembly site. At the assembly site, the parallel members are placed on the girder and brought into a position close to their final position through use of a template. Final adjustment of the parallel members is accomplished by using a laser equipped with a revolving prism to define a plane of reference to which each parallel member is precisely adjusted by bringing an electronic pattern device attached to each section into the plane of reference.

Preferably the parallel members have tension cables extending perpendicularly through the member and connecting with the end members at the side of the mirror assembly. The tension cables will then pull the reflector units together forcing their long edges into the edge strips thus increasing the rigidity of the mirror structure.

BRIEF DESCRIPTION OF THE DRAWINGS

FIG. 2 is an enlarged partial view of a parallel member illustrating the adjustment of the member relative to a girder;

FIG. 3 is an enlarged section of FIG. 2 taken along lines III—III;

FIG. 4 is an enlarged section of a portion of FIG. 1 taken along lines IV—IV;

FIG. 6 illustrates precambering of a section;

FIG. 7 is an end view of FIG. 6;

FIG. 8 is a sectional view of the assembly of FIG. 7 illustrating the manner in which a hole is drilled in the web of a precambered section;

FIG. 9 is a cross-section of an articulated pin used in joining a precambered section to a parallel member;

FIG. 10 is an end view of the articulated pin of FIG. 9;

FIG. 11 is a side view of a parallel member forming a joist;

FIG. 12 is a diagrammatic view illustrating placement of a precambered section in a parallel member;

FIG. 13 is a diagrammatic view of a side of a cradle forming an auxiliary part of a parallel member;

FIG. 14 illustrates adjustment of parallel members with respect to a girder using a template;

FIG. 15 is an end view of the template and partial mirror assembly of FIG. 14; and FIG. 16 is a perspective view illustrating final adjustment of parallel members with respect to a girder using a laser equipped with a rotating prism.

BEST MODE FOR CARRYING OUT THE INVENTION

Figure 1:
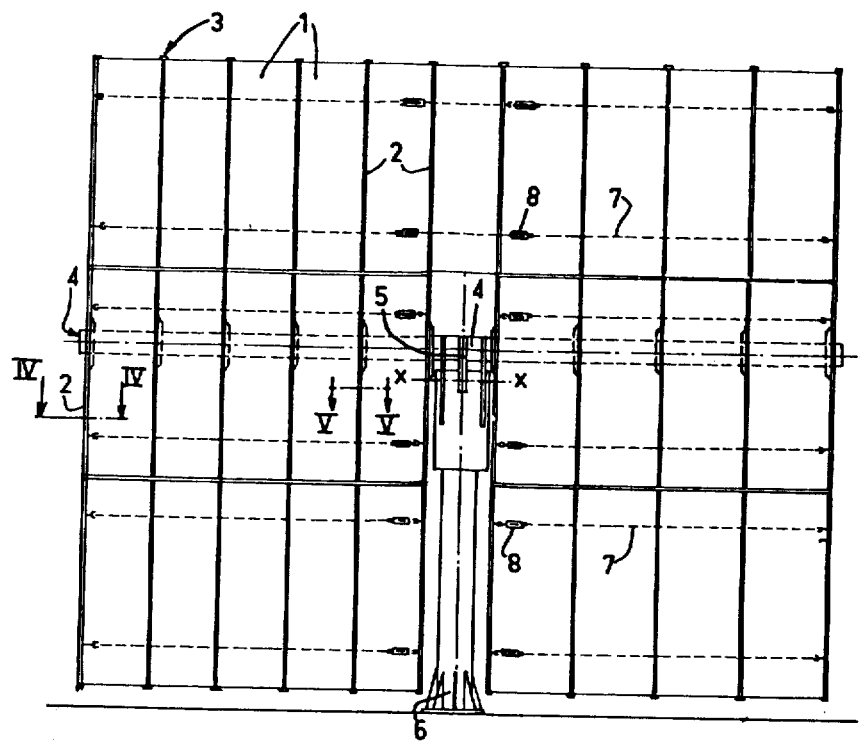
FIG. 1 is an elevation view of a solar mirror according to the invention.

Referring to FIG. 1, there is illustrated a solar mirror constructed according to the invention comprising a plurality of rectangular reflector panels 1 supported on their long sides by flexible elastomer strips 2 which are mounted on a plurality of spaced parallel extending members 3 each comprising a framework as shown in FIGS. 2, 11, 12, 15 and 16. The members 3 extend perpendicular to the plane of the panels 1 and are fixed with respect to a girder 4. Girder 4 extends perpendicular to the members 3 and is mounted to pivot at the end of arm 5 around a horizontal axis X—X with respect to the upper part of the vertically extending fixed base or swivel frame 6. Tension cables provided with turnbuckles join the end or side members 3 of the mirror assembly to form a rigid undeformable assembly with the reflector panels 1 and strips 2.

The girder 4 has two flanges 10 for each parallel member 3 and each flange 10 has two oblong holes 11 into which bolts 12 are fitted. Bolts 12 in turn slide in slides 13 mounted on member 3 with the slides being on both sides of the girder 4 as shown in FIG. 2. Bolts 12 may be locked with respect to slides 13 in any position by tightening nuts 9 threaded on the end of the bolts as shown in FIGS. 2 and 3. A lug 14 which is fixed to each flange 10 has a hook portion on one end as shown in FIG. 3 which extends over a threaded tie bolt 15 connected to a member 3. A tie bolt 15 is locked to a hook portion by nuts 16 positioned on both sides of the hook portion and the tie bolt is connected to a member 3 by nuts 17 as shown in FIG. 2.

By this construction it is possible to adjust a member 3 with respect to girder 4 to a precise correct position. This is done in an initial stage by simultaneously tightening or loosening the two tie bolts 15 to position a member 3 with respect to girder 4 at a predetermined reference point. Then, by tightening one tie bolt 15 and loosening the other, the member 3 can be made to pivot at a relatively small angle to adjust its angular position without changing its distance from the girder. Preferably in order to facilitate this pivotal adjustment, the axis of the lower tie bolt 15 which extends perpendicular to the mirror pivotal axis X—X, passes near to the axis so that angular or pivotal adjustment may be made by tightening or loosening only the upper tie bolt 15.

Figure 5:
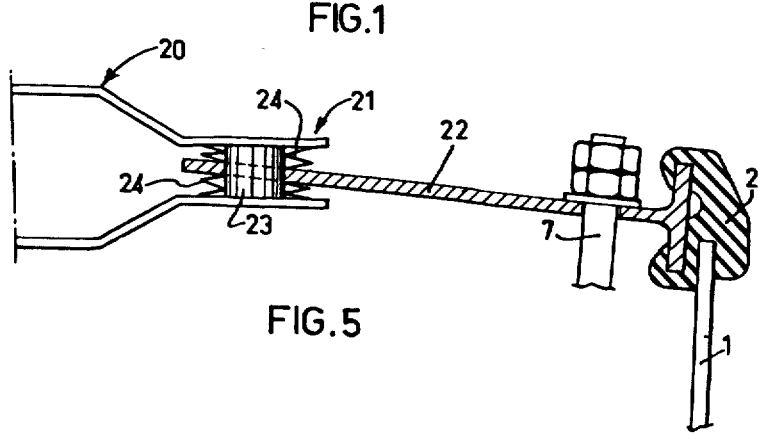
FIG. 5 is an enlarged section of a portion of FIG. 1 taken along lines V—V.

As shown in FIG. 11, a member 3 comprises a rigid lattice or framework comprising a plurality of beams joined together. As shown in FIGS. 4 and 5, each part of a member 3 adjacent the back face of a reflector panel 1 comprises a hollow beam 20 having a slotted portion or cradle 21. The web of a precambered T shaped section 22 extends into the cradle 21 with flanges of the section mounting the strips 2.

As shown in FIG. 5, an alignment pin is fixed with respect to the two arms of the cradle 21 and extends through a hole in the web of section 22 so that the section may pivot about the pin. Elastic washers 24 are positioned on the pin 23 between the two arms of the cradle and the sides of the web to provide a centering force to center the section 22 in the cradle. The precambered sections 22 and members 3 are thus joined by a flexible connection allowing the sections to be moved when cables 7 are tightened to bring the edges of the various reflector panels into close contact with the slots in strips 2.

If desired, protective metal sheets 39 may be mounted on beams 20 by means of U sections 38 behind the reflector panels 1 to protect the reflecting layer deposited on the back faces of the reflector panels. This construction is shown in FIG. 4.

The manner in which the sections 22 are precambered to the shape desired for a mirror, the placement of the sections 22 in the parallel members 3, and the assembly and adjustment of the member is best seen by reference to FIGS. 6-16.

As shown in FIGS. 6 and 7, T sections 22 are initially cambered at a factory site to a desired shape by using jacks 27 carried by a support 28 to bend the sections into the desired curvature. Holes 29 are then drilled in the web of the section by drills extending through drilling barrels as shown in FIG. 8 which are spaced at regular intervals along the support 28. Pins 23 are then inserted through holes 29 and washers 24 applied to the pins as shown in FIG. 9. The webs of the pins 23 are slightly flared by crimping 31 as shown in FIG. 10 to retain the washers on the pins.

The hollow beams 20 of the members 3 are then drilled with aligned holes 32 which are intended to be brought opposite holes 29 in the webs of the T sections 22. The web of each section is then introduced into a cradle 21 such that all the pins 23 are aligned with all the holes 32 of a single member. A bolt as shown in FIG. 4 is then inserted through each of the holes 32 and pins 23 and secured by a nut whereby the desired degree of curvature is restored into the sections.

The members 3 and attached sections 22 are then shipped to the mirror assembly site for mounting onto a girder 4 and base 6. The members are then positioned roughly with respect to the girder by adjusting tie bolts 15 to bring the sections 22 attached to the members 3 into contact with counterforms 35 of a template 36 as shown in FIGS. 14 and 15.

Final adjustment of the sections is accomplished by equipping the sections with an electron pattern device and the base 6 with a prism associated with a laser 38' as shown in FIG. 16 and in the manner described in U.S. Pat. No. 4,226,506. Turning the prism will establish a plane of reference to which the patterns of the various sections may be precisely positioned by the adjustment elements previously described.

We claim:

1. A solar mirror having a plurality of contiguous rectangular reflector panels mounted on a rigid frame movable with respect to a fixed base where the frame includes a plurality of precambered sections adapted to engage the long sides of said panels and a plurality of carrying joists in the form of spaced parallel extending members mounting said precambered sections, characterized in that said frame comprises a single bearing girder having a longitudinal axis extending perpendicular to and supporting said members, in having distance adjustment means for sliding said members in a plane perpendicular to said longitudinal axis, and in having an angular adjustment means for rotating said members in said perpendicular plane with respect to said girder about a pivotal axis of the solar mirror.

2. A solar mirror according to claim 1 where the distance adjustment means and the angular adjustment means are combined and comprise a pair of slides on each said member, a pair of flanges fixed to said girder and slidably engaging a pair of slides, and a pair of tie bolts on each member to adjust its position with respect to said flanges.

3. A solar mirror according to claim 2 wherein each said flange has an oblong hole having a locking element therein which slidably engages a slide.

4. A solar mirror according to claims 2 or 3 wherein each said flange comprises a lug including a hook engaging a tie bolt and having in addition locking means in the form of nuts screwed on said tie bolt for locking said hook onto said tie bolt.

5. A solar mirror according to claim 4 wherein the axis of one tie bolt on a member extends adjacent to and perpendicular to said pivotal axis.

6. A solar mirror according to claims 1, 2 or 3 including a flexible articulation means connecting each said precambered section to a said member.

7. A solar mirror according to claim 6 wherein said member includes a slotted hollow beam forming a cradle having arms and wherein said flexible articulation means comprises a pin positioned between the arms of the cradle and extending through a hole in a precambered section, and elastic washers on said pin positioned between said arms and said section.

* * * * *